(12) United States Patent
Gay et al.

(10) Patent No.: US 7,465,170 B2
(45) Date of Patent: Dec. 16, 2008

(54) EXTENDED INPUT/OUTPUT CARD CAPACITY COMPUTER SYSTEM

(75) Inventors: Raphael Gay, Ft. Collins, CO (US); Christine Lin, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/600,977

(22) Filed: Nov. 17, 2006

(65) Prior Publication Data

US 2008/0117588 A1     May 22, 2008

(51) Int. Cl.
*G01R 27/28* (2006.01)

(52) U.S. Cl. .................. 439/65; 702/118; 702/119; 361/752; 361/797

(58) Field of Classification Search .................. 439/65; 702/118, 119; 361/752, 797, 790
See application file for complete search history.

(56) References Cited

U.S. PATENT DOCUMENTS 6,351,719 B1 *   2/2002   Harenza et al. .............. 702/118
7,254,038 B2 *   8/2007   Drako ........................ 361/752

* cited by examiner

*Primary Examiner*—Gary F. Paumen

(57) ABSTRACT

In one embodiment, a computer system comprises at least one input/output device, and a motherboard designed in compliance with an ATX form factor standard and comprising eight slots to receive input/output cards.

13 Claims, 5 Drawing Sheets

EXTENDED INPUT/OUTPUT CARD CAPACITY COMPUTER SYSTEM

BACKGROUND

Many electronic devices such as, e.g., computer systems, include circuit boards onto which components such as, e.g., integrated circuits may be mounted. Most computer systems include a main circuit board, frequently referred to as a motherboard, to which additional circuit boards and/or cards may be coupled.

Varying consumer preferences motivate computer manufacturers to design and manufacture computer systems having a wide variety of physical form factors. For example, computer systems may be offered in full-sized or reduced-size housings. In addition, motherboard configurations may vary based on the components included in the computing system.

Computer system designers have developed a variety of form factor design standards to accommodate varying consumer preferences. The ATX (Advance Technology Extended) standard was introduced in 1995. Numerous variations of the ATX were subsequently introduced with both smaller and larger form factors, including the microATX, Mini ATX, FlexATX and Extended ATX (EATX).

A computer system chassis compatible with the ATX standard provides only seven input/output (I/O) card slots. Given the increase in peripheral cards available to computer users, the seven card limitation for ATX computer systems has become problematic for some computer users.

DETAILED DESCRIPTION

Described herein are embodiments of circuit board assemblies and computer systems which may incorporate the circuit board assemblies. In the description herein numerous specific details are provided, such as examples of components and/or methods, to provide a thorough understanding of the circuit board assemblies. One skilled in the relevant art will recognize, however, that embodiment(s) can be practiced without one or more of the specific details, or with other apparatus, systems, methods, components, materials, parts, and/or the like. In other instances, well-known structures, materials, or operations are not shown or described in detail to avoid obscuring aspects of embodiments.

Figure 1:
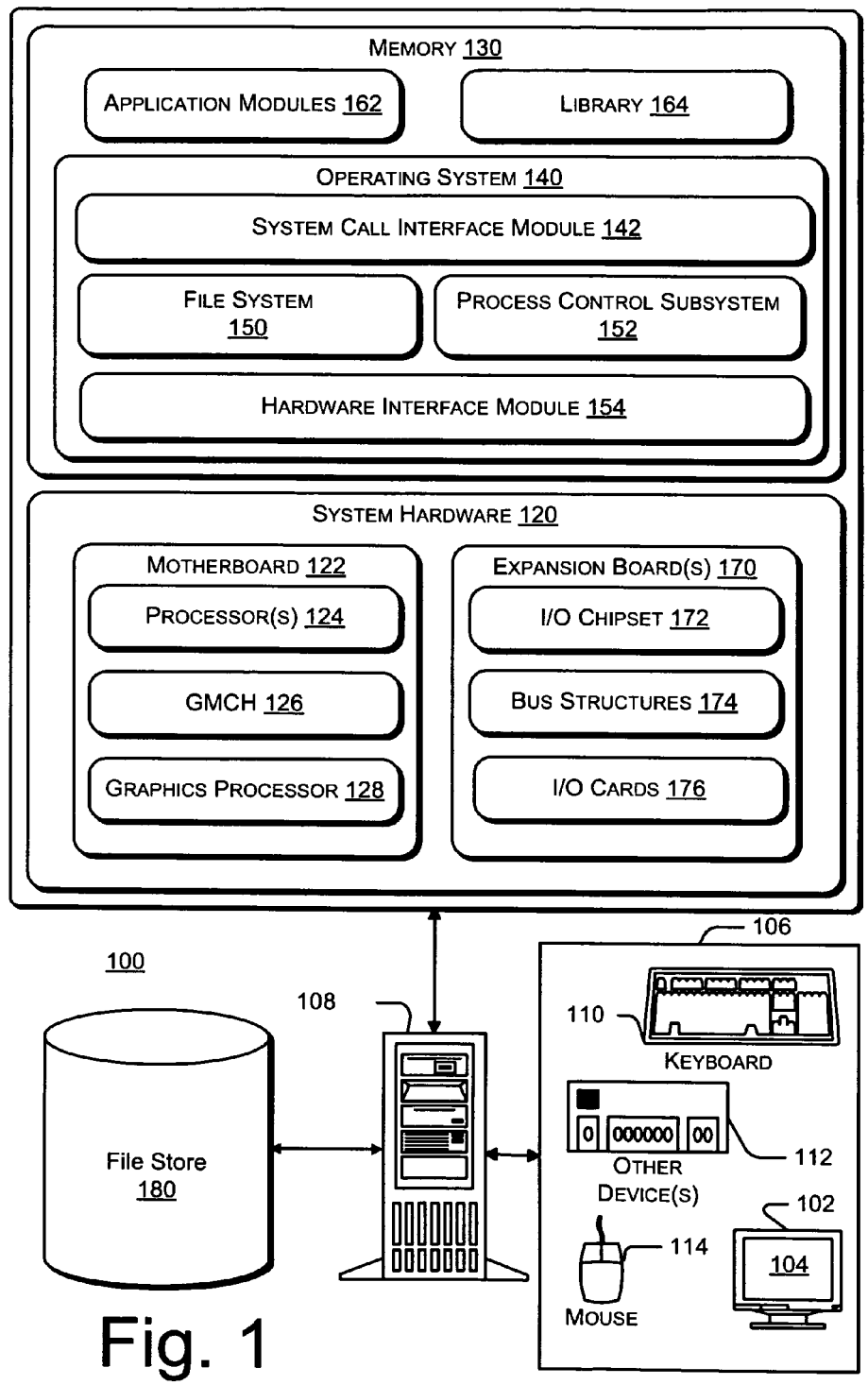
FIG. 1 is a schematic illustration of a computing system, according to embodiments.

FIG. 1 is a schematic illustration of an exemplary computer system 100. The computer system 100 includes a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that allows the system 100 to receive input from a developer and/or a user. The computer 108 includes system hardware 120 and random access memory and/or read-only memory 130. A file store 180 is communicatively connected to computer 108. File store 180 may be internal such as, e.g., one or more hard drives, or external such as, e.g., one or more external hard drives, network attached storage, or a separate storage network.

In one embodiment, system hardware 120 may include a motherboard 122 and one or more expansion boards 170. Motherboard 122 may host a plurality of components including one or more processors 124, a graphics and memory control hub (GMCH) 126, and a graphics processor. Motherboard 122 may further include sockets to receive the various components mounted on motherboard 122 and circuit traces to provide electrical connections between the components.

In one embodiment, expansion board 170 may be an input/output (I/O) board. Expansion board 170 may include an I/O chipset such as, for example, a PCI-Express (PCIE) chipset 172, and bus structures 174 and one or more I/O cards (or ports) 176. In alternate embodiments expansion board may include components which provide different functionality.

Memory 130 includes an operating system 140 for managing operations of computer 108. In one embodiment, operating system 140 includes a hardware interface module 154 that provides an interface to system hardware 120. In addition, operating system 140 includes one or more file systems 150 that manages files used in the operation of computer 108 and a process control subsystem 152 that manages processes executing on computer 108. Operating system 140 further includes a system call interface module 142 that provides an interface between the operating system 140 and one or more application modules 162 and/or libraries 164.

In operation, one or more application modules 162 and/or libraries 164 executing on computer 108 make calls to the system call interface module 142 to execute one or more commands on the computer's processor. The system call interface module 142 invokes the services of the file systems 150 to manage the files required by the command(s) and the process control subsystem 152 to manage the process required by the command(s). The file system 150 and the process control subsystem 152, in turn, invoke the services of the hardware interface module 154 to interface with the system hardware 120.

The particular embodiment of operating system 140 is not critical to the subject matter described herein. Operating system 140 may be embodied as a UNIX operating system or any derivative thereof (e.g., Linux, Solaris, etc.) or as a Windows® brand operating system.

Figure 2:
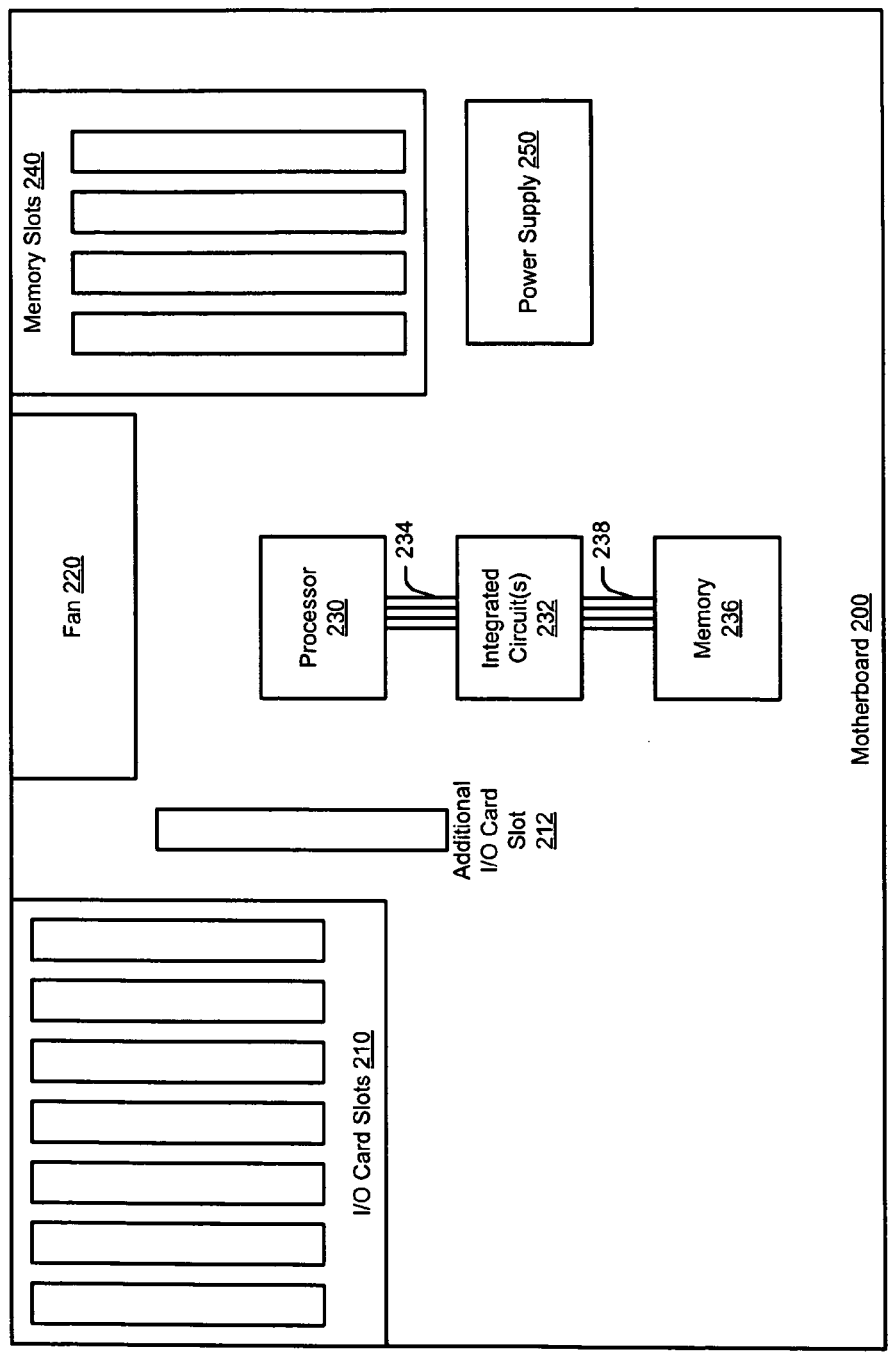
FIG. 2 is a schematic top view of a motherboard assembly according to an embodiment.

The computing system 100 may include one or more circuit board assemblies. FIG. 2 is a schematic top view of a motherboard assembly according to an embodiment. Referring to FIG. 2, motherboard 200 may be configured in accord with an ATX form factor standard.

Motherboard 200 may include a processor 230. For example, the processor 230 may be one or more processors in the Pentium® family of processors including the Pentium® II processor family, Pentium® III processors, Pentium® IV processors, Pentium® M processors available from Intel® Corporation of Santa Clara, Calif. Alternatively, other CPUs may be used, such as Intel's Itanium®, XEON®, and Celeron® processors. The processors may have a single or multi core design.

One or more integrated circuits 232 may be coupled to the processor by a communication bus 234. For example, integrated circuits 232 may include a graphics and memory control hub (GMCH), a include a memory controller that is coupled to a main system memory 236 by a communication bus 238. The main system memory 236 stores data and sequences of instructions that are executed by the processor 230. In one embodiment, the main system memory 236 includes random access memory (RAM); however, the main system memory 236 may be implemented using other memory types such as dynamic RAM (DRAM), synchronous DRAM (SDRAM), and the like. Additional devices may also be coupled to the bus 234, such as multiple CPUs and/or multiple system memories.

Motherboard 200 may include one or more memory slots 240. In one embodiment memory slots 240 may be configured to accommodate memory modules such as, e.g., dual in-line memory modules (DIMMs). The memory modules coupled to memory slots 240 may be used to implement system memory 236.

Motherboard 200 may include a power supply 250 to supply power to the various components of motherboard and a fan 220 to facilitate dissipating heat generated by various components of motherboard 200.

Motherboard 200 may include an array of input/output (I/O) card slots 210 configured to receive peripheral I/O cards such as, e.g., sound cards, video cards, or the like. Motherboards compatible with an ATX standard commonly include an array of seven I/O slots 210. In one embodiment, motherboard 210 may be configured to include an additional I/O card slot 212. Thus, the additional I/O card slot 212 permits an AXT compatible motherboard to have up to eight I/O slots.

Figure 3:
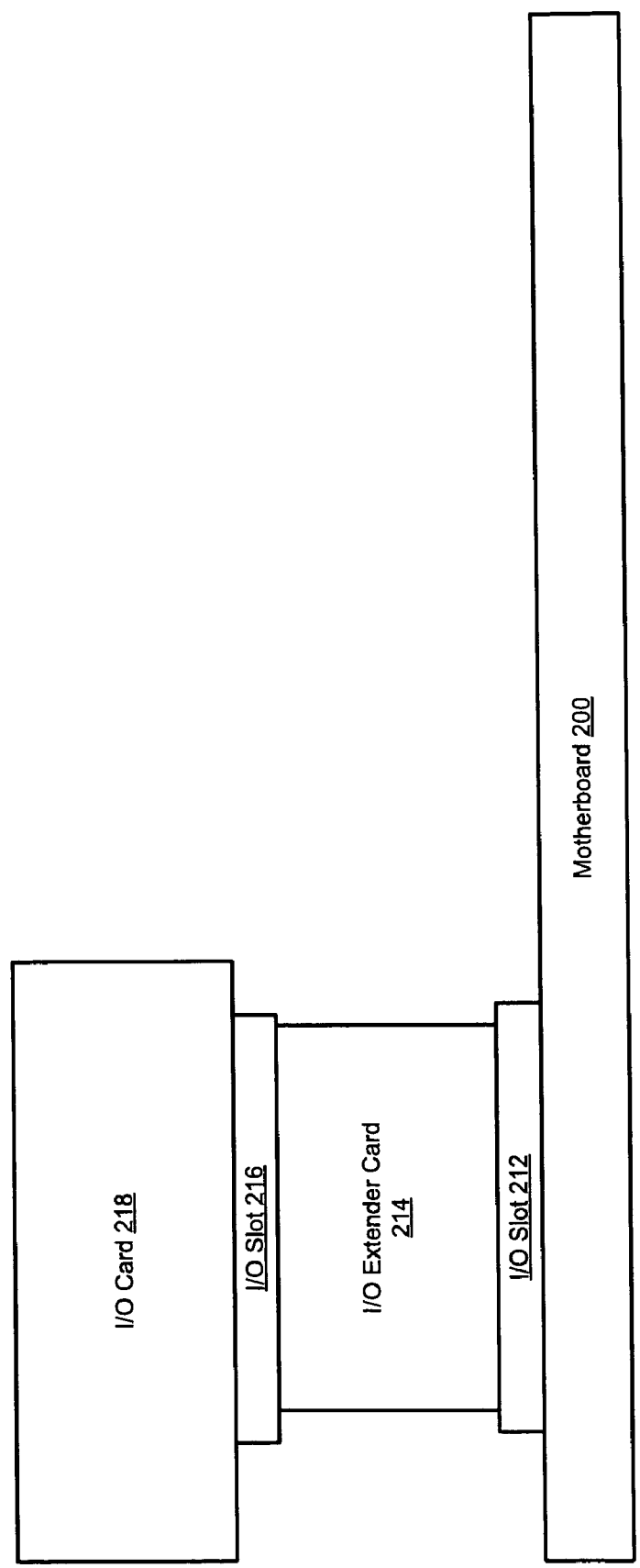
FIG. 3 is a schematic, side view of a motherboard assembly according to an embodiment.

FIG. 3 is a schematic, side view of a motherboard assembly according to an embodiment. In one embodiment, the motherboard 200 depicted in FIG. 2B may correspond to the motherboard 200 depicted in FIG. 2A. Referring to FIG. 3, an I/O extender card 214 may be configured to fit into the I/O slot 212. The I/O extender card provides physical and electrical connections between an I/O card 218 card and the I/O card slot 212 on the motherboard 200.

For example, in one embodiment I/O extender card 214 may include an I/O slot 216 which emulates I/O slot 212 on motherboard 200 and circuit traces to provide electrical connections between pins on I/O slot 216 and pins in I/O slot 212. In use, I/O extender card 214 may be coupled to I/O slot 212 on motherboard 200 and an I/O card 218 may be coupled to I/O slot 216. Thus, I/O extender card 214 elevates I/O card 218 above the motherboard 200 by a height that corresponds to the height of extender card 214. This permits the I/O card to be positioned above other components on motherboard 200.

Figure 4:
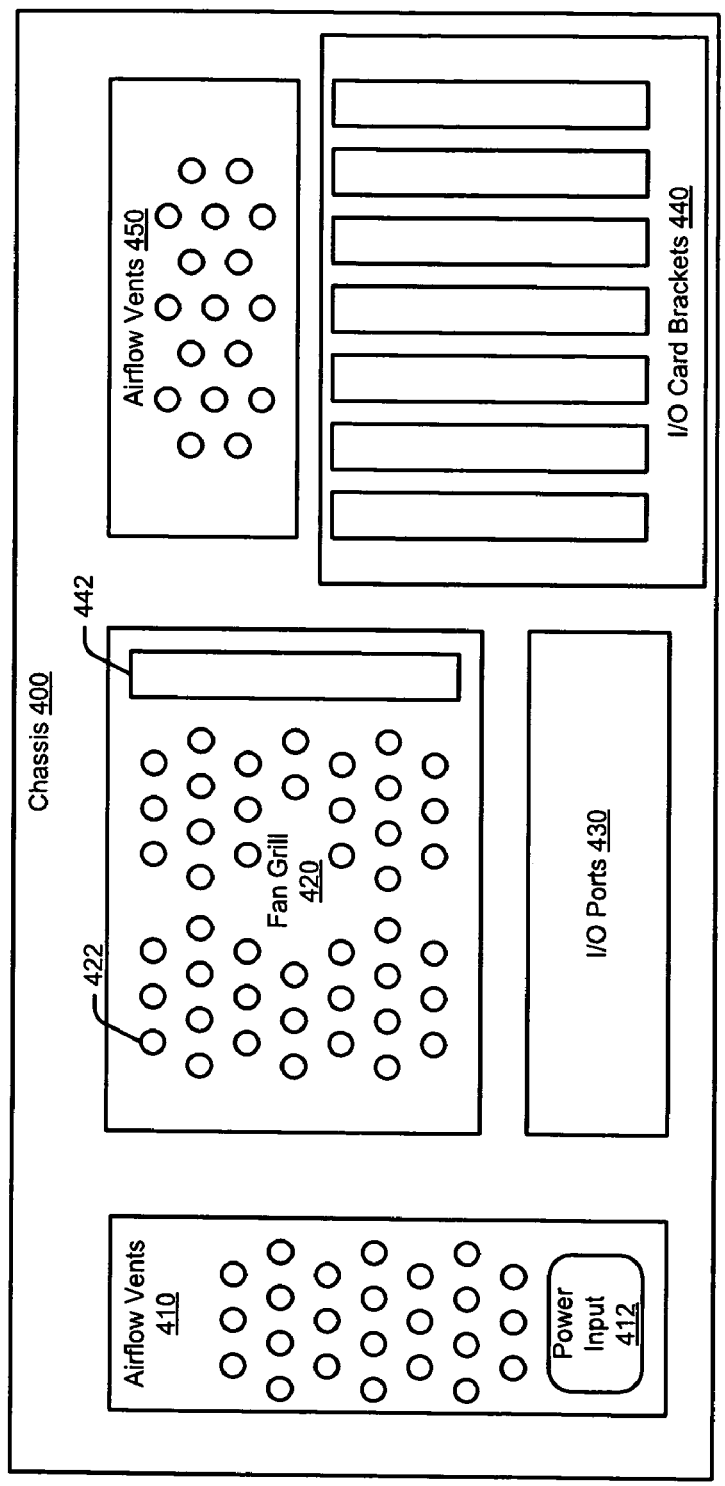
FIG. 4 is a schematic, rear view of a computer system chassis according to an embodiment.

FIG. 4 is a schematic, rear view of a computer system chassis 400 according to an embodiment. Referring to FIG. 4, chassis 400 may include airflow vents 410, 450 and a power input 412 to receive a power cord. A fan grill 420 covers the fan 200 and includes one or more ventilation holes 422 to permit air to flow across fan grill 420. Chassis 400 may further include one or more I/O ports 430 such as, for example, universal serial bus (USB) ports, Ethernet ports, RS ports, or other ports.

Chassis 400 may further include an array of I/O card brackets 440. In one embodiment, I/O card brackets 440 may be configured to receive I/O cards that are positioned within the I/O slots 210 on motherboard 200. In addition, chassis 400 includes at least one additional I/O card bracket 442 to receive an I/O card 218 positioned within the I/O slot 216 of I/O card extender 214.

Figure 5:
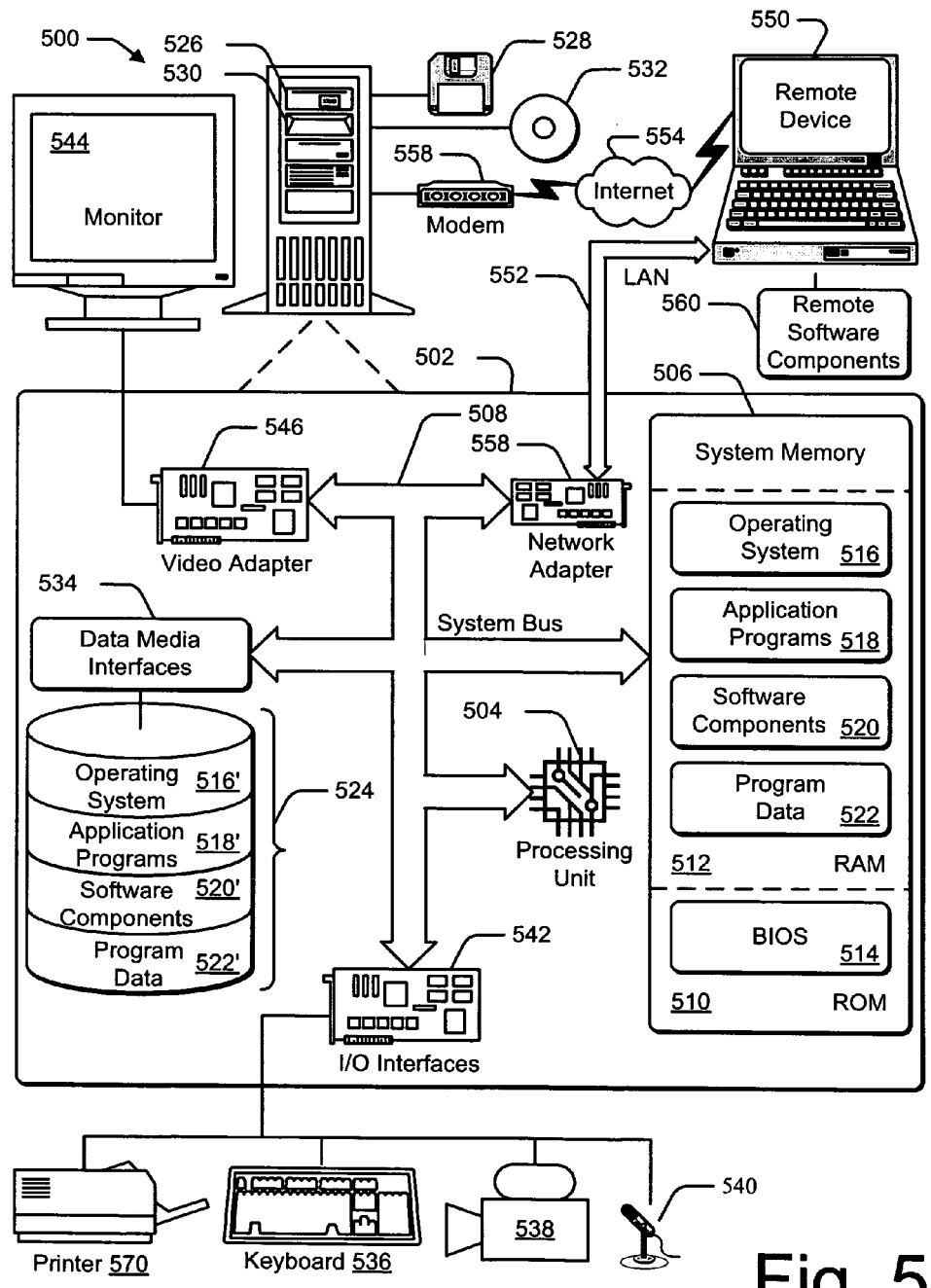
FIG. 5 is a schematic illustration of a computing system, according to an embodiment.

FIG. 5 is a schematic illustration of a computing system according to an embodiment. The components shown in FIG. 5 are only examples, and are not intended to suggest any limitation as to the scope of the functionality of the invention; the invention is not necessarily dependent on the features shown in FIG. 5.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 5, the components of computer 500 may include, but are not limited to, a processing unit 504, a system memory 506, and a system bus 508 that couples various system components including the system memory 506 to the processing unit 504. The system bus 508 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

The system memory 506 includes computer storage media in the form of volatile and/or nonvolatile memory such as read only memory (ROM) 510 and random access memory (RAM) 512. A basic input/output system 514 (BIOS), containing the basic routines that help to transfer information between elements within computer 500, such as during start-up, is typically stored in ROM 510. RAM 512 typically contains data and/or program modules that are immediately accessible to and/or presently being operated on by processing unit 504. By way of example, and not limitation, FIG. 5 illustrates operating system 516, application programs 518, other software components 520, and program data 522.

The computer 500 may include other removable/non-removable, volatile/nonvolatile computer storage media. By way of example only, the computer system of FIG. 5 may include a hard disk drive 524 that reads from or writes to non-removable, nonvolatile magnetic media, a magnetic disk drive 526 that reads from or writes to a removable, nonvolatile magnetic disk 528, and an optical disk drive 530 that reads from or writes to a removable, nonvolatile optical disk 532 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 524 is typically connected to the system bus 508 through a non-removable memory interface such as data media interface 534, and magnetic disk drive 526 and optical disk drive 530 are typically connected to the system bus 508 by a removable memory interface.

The drives and their associated computer storage media discussed above and illustrated in FIG. 5 provide storage of computer-readable instructions, data structures, program modules, and other data for computer 500. In FIG. 5, for example, hard disk drive 524 is illustrated as storing operating system 516', application programs 518', software components 520', and program data 522'. Note that these components can either be the same as or different from operating system 516, application programs 518, software components 520, and program data 522. Operating system 516, application programs 518, other program modules 520, and program data 522 are given different numbers here to illustrate that, at a minimum, they are different copies. A user may enter commands and information into the computer 500 through input devices such as a keyboard 536 and pointing device 538, commonly referred to as a mouse, trackball, or touch pad. Other input devices (not shown) may include a microphone 540, joystick, game pad, satellite dish, scanner, or the like. These and other input devices are often connected to the processing unit 504 through an input/output (I/O) interface 542 that is coupled to the system bus, but may be connected by other interface and bus structures, such as a parallel port, game port, or a universal serial bus (USB). A monitor 544 or other type of display device is also connected to the system bus 506 via an interface, such as a video adapter 546. In addition to the monitor 544, computers may also include other peripheral output devices (e.g., speakers) and one or more printers 570, which may be connected through the I/O interface 542.

The computer may operate in a networked environment using logical connections to one or more remote computers, such as a remote computing device 550. The remote computing device 550 may be a personal computer, a server, a router, a network PC, a peer device or other common network node, and typically includes many or all of the elements described above relative to computer 500. The logical connections depicted in FIG. 5 include a local area network (LAN) 552 and a wide area network (WAN) 554. Although the WAN 554 shown in FIG. 5 is the Internet, the WAN 554 may also include other networks. Such networking environments are commonplace in offices, enterprise-wide computer networks, intranets, and the like.

When used in a LAN networking environment, the computer 500 is connected to the LAN 552 through a network interface or adapter 556. When used in a WAN networking environment, the computer 500 typically includes a modem 558 or other means for establishing communications over the Internet 554. The modem 558, which may be internal or external, may be connected to the system bus 506 via the I/O interface 542, or other appropriate mechanism. In a networked environment, program modules depicted relative to the computer 500, or portions thereof, may be stored in the remote computing device 550. By way of example, and not limitation, FIG. 5 illustrates remote application programs 560 as residing on remote computing device 550. It will be appreciated that the network connections shown are exemplary and other means of establishing a communications link between the computers may be used.

Reference in the specification to "one embodiments" or "an embodiment" means that a particular feature, structure, or characteristic described in connection with the embodiment is included in at least an implementation. The appearances of the phrase "in one embodiment" in various places in the specification are not necessarily all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A computer system, comprising:
   at least one input/output device; and
   a motherboard designed in compliance with an ATX form factor standard and comprising eight slots to receive input/output cards;
   a chassis, wherein the chassis comprises eight input/output card brackets, wherein one of the eight input/output card brackets is physically displaced from other input/output card brackets;
   an extender card configured to fit into at least one of the slots to receive an input/output card;
   an input/output card coupled to the extender card; and
   an input/output card coupled to the input/output card bracket,
   wherein the extender card provides physical and electrical connections between the input/output card bracket, the input/output card and the input/output card slot on the motherboard.

2. The computer system of claim 1, further comprising:
   an extender card configured to fit into at least one of the slots for an input/output card; and
   an input/output card coupled to the extender card;
   wherein the extender card provides physical and electrical connections between the input/output card and the input/output card slot on the motherboard.

3. The computer system of claim 2, wherein the extender card comprises circuit traces to couple pins on an input/output card to pins on the slot.

4. The computer system of claim 3, wherein:
   the extender card comprises an input/output slot which emulates an input/output card slot on the motherboard;
   the circuit traces couple the input/output slot on the extender card to an input/output slot on the motherboard; and
   the input/output card is coupled to the extender card, such that the input/output card coupled to the extender card is elevated above components on the motherboard at a height corresponding to the height of the extender card.

5. The computer system of claim 4, wherein the extender card raises the extender card to a height sufficient to permit the input/output card to be positioned such that the extender can be coupled to an input/output slot adjacent a fan assembly on the chassis of the computer system.

6. A circuit board assembly, comprising:
   a motherboard designed in compliance with an ATX form factor standard and comprising eight slots to receive input/output cards;
   a chassis, and wherein the chassis comprises eight input/output card brackets, wherein one of the eight input/output card brackets is physically displaced from other input/output card brackets;
   an extender card configured to fit into at least one of the slots to receive an input/output card;
   an input/output card coupled to the extender card;
   an input/output card coupled to the input/output card bracket;
   wherein the extender card provides physical and electrical connections between the input/output card bracket, the input/output card and the input/output card slot on the motherboard.

7. The circuit board assembly of claim 6, further comprising:
   an extender card configured to fit into at least one of the slots to receive an input/output card; and
   an input/output card coupled to the extender card;
   wherein the extender card provides physical and electrical connections between the input/output card and the input/output card slot on the motherboard.

8. The circuit board assembly of claim 7, wherein the extender card comprises circuit traces to couple pins on an input/output card to pins on the slot.

9. The circuit board assembly of claim 8, wherein:
   the extender card comprises an input/output slot which emulates an input/output card slot on the motherboard;

the circuit traces couple the input/output slot on the extender card to an input/output slot on the motherboard; and the input/output card is coupled to the extender card, such that the input/output card coupled to the extender card is elevated above components on the motherboard at a height corresponding to the height of the extender card.

10. A computer system, comprising:

at least one input/output device;

a motherboard designed in compliance with an ATX form factor standard and comprising eight slots to receive input/output cards; and a chassis comprising a back panel, wherein the back panel includes eight input/output card brackets;

an extender card configured to fit into the at least one slot for an input/output card; and an input/output card coupled to the extender card;

wherein one of the eight input/output card brackets is physically displaced from other input/output card brackets and proximate a fan assembly; and wherein the extender card provides physical and electrical connections between the input/output card bracket, the input/output card and the input/output card slot on the motherboard.

11. The computer system of claim 10, wherein the extender card comprises circuit traces to connect pins on an input/output card to pins on the slot.

12. The computer system of claim 11, wherein:

the extender card comprises an input/output slot which emulates an input/output card slot on the motherboard;

the circuit traces couple the input/output slot on the extender card to an input/output slot on the motherboard; and the input/output card is coupled to the extender card, such that the input/output card coupled to the extender card is elevated above components on the motherboard at a height corresponding to the height of the extender card.

13. The computer system of claim 12, wherein the extender card raises the extender card to a height sufficient to permit the input/output card to be positioned such that the extender can be coupled to an input/output slot adjacent a fan assembly on the chassis of the computer system.

* * * * *